Patented Jan. 3, 1950

2,493,489

UNITED STATES PATENT OFFICE 2,493,489

METHODS OF CONVERTING MANNOSIDO-STREPTOMYCIN AND DIHYDROMANNO-SIDOSTREPTOMYCIN INTO STREPTOMYCIN AND DIHYDROSTREPTOMYCIN, RESPECTIVELY

Asger F. Langlykke, Highland Park, and David Perlman, Princeton, N. J., assignors to E. R. Squibb & Sons, New York, N. Y., a corporation of New York No Drawing. Application November 27, 1948, Serial No. 62,415

6 Claims. (Cl. 195—31)

This invention relates to streptomycins and derivatives thereof.

In 1944, Schatz, Bugie, and Waksman (Proc. Soc. Exp. Biol. Med. 1944, 57, 244) showed that a potent antibiotic, termed "streptomycin" was formed during the growth of the organism *Actinomyces griseus* (now called *Streptomyces griseus*); and this antibiotic has since been established to be of high clinical utility.

It was later found that another product showing streptomycin activity was formed at the same time. The first streptomycin obtained in pure form was referred to as "streptomycin A," and is now referred to as "N-methyl-L-glucosaminido-streptosidostreptidine," or simply as "streptomycin"; the second streptomycin obtained in pure form was referred to as "streptomycin B," and is now referred to as "D-mannosido-N-methyl-L-glucosaminidostreptosidostreptidine," or as "mannosidostreptomycin," and the crude or partially purified mixture of streptomycins is now referred to as "streptomycin complex" (cf. Science, 107, 233–234, March 5, 1948). The terms streptomycin, mannosidostreptomycin, and streptomycin complex, when employed unmodified hereinafter, have reference to these products in their usual free-base and/or water-soluble acid-addition-salt forms.

Streptomycin, mannosidostreptomycin, and streptomycin complex have been converted by catalytic hydrogenation into the corresponding dihydro derivative (e. g., dihydrostreptomycin), these derivatives being advantageous by virtue of their stability to alkali and for other reasons [cf. Fried and Wintersteiner, J. Am. Chem. Soc. 69, 79–86 (1947)]. The terms dihydrostreptomycin, dihydromannosidostreptomycin, and dihydrostreptomycin complex, when employed unmodified hereinafter, similarly refer to these products in both the base and salt forms.

Inasmuch as the antibiotic activity of streptomycin against most bacteria is about four times as great as that of mannosidostreptomycin, a streptomycin complex should desirably have a high proportion of streptomycin, a substantially-pure streptomycin being of course preferred. This has been attained heretofore by various purification methods (i. e. removal of part or all of the mannosidostreptomycin from the streptomycin complex), but these methods are generally complicated and/or inefficient (and consequently expensive); and it has been attained also by using a strain of *Streptomyces griseus* which produces a high proportion of streptomycin, a streptomycin complex containing such high proportion of streptomycin being more readily and completely separated into streptomycin and mannosidostreptomycin. In the course of producing products composed essentially of streptomycin, large quantities of mannosidostreptomycin are obtained, which have heretofore represented a virtually useless by-product. A similar situation exists with respect to dihydrostreptomycin complex, the purification of which yields the virtually useless dihydromannosidostreptomycin as a by-product.

It is the object of this invention to provide methods of utilizing mannosidostreptomycin and dihydromannosidostreptomycin; especially methods of converting mannosidostreptomycin into the useful product streptomycin, and dihydromannosidostreptomycin into the useful product dihydrostreptomycin.

It has been found that: (A) in a growing culture of a streptomycin-producing strain of *Streptomyces griseus*, the originally and/or concurrently formed mannosidostreptomycin is at the same time being converted into streptomycin; (B) said culture is able to decompose added mannosidostreptomycin to streptomycin, and added dihydromannosidostreptomycin to dihydrostreptomycin; and (C) that an enzyme or enzymes may be obtained from said culture, which enzyme is capable of converting mannosidostreptomycin to streptomycin, and dihydromannosidostreptomycin to dihydrostreptomycin. These properties (the properties of a mannosidostreptomycinase) are lacking in cultures of strains of *Streptomyces griseus* which do not produce streptomycin, and in other Actinomyces cultures which do not produce streptomycin. Some mannosidostreptomycinase activity was found to be present in several multi-enzyme preparations (e. g., Rhozyme P11 (manufactured by Rohm and Hass), Liquefase (Standard Brands, Inc.), a purified amylase from Northern Regional Research Laboratory, Peoria, Ill., and an experimental amylase preparation from Standard Brands Laboratory, New York); but the degree of activity was much less than that of cell-free enzyme preparations obtained from a streptomycin-producing strain of *Streptomyces griseus*.

These findings have been made the basis of a number of useful methods, which are variants of a basic method. Thus: (I) mannosidostreptomycin or dihydromannosidostreptomycin is added (per se or in the respective complex) to a growing culture of a streptomycin-producing strain of *Streptomyces griseus*, the added mannosidostreptomycin (for example) being converted to streptomycin and being recoverable with the streptomycin produced by the culture (or, to put it otherwise, the total streptomycin activity of the culture being enhanced by the conversion); (II) a culture of a streptomycin-producing strain of *Streptomyces griseus* is incubated until substantially all of the mannosidostreptomycin originally and/or concurrently formed has been converted to streptomycin; (III) the solids are separated from a culture of a streptomycin-producing strain of *Streptomyces griseus*, and the liquid obtained (containing streptomycin and mannosidostreptomycinase) is used for the conversion of mannosidostreptomycin into streptomycin, or dihydromannosidostreptomycin into dihydrostreptomycin; or (IV) the mannosidostreptomycinase-containing liquid [cf. III] is treated to concentrate the enzyme therein or separate it from the streptomycin, and the resulting enzyme preparation used to convert mannosidostreptomycin into streptomycin, or dihydromannosidostreptomycin into dihydrostreptomycin.

It is indicated that the enzyme induces hydrolysis of mannosidostreptomycin at the point of attachment of the mannose moiety, mannose being identifiable in the solution as the phenylhydrazone, and the maltol assay of the solution remaining unchanged while the antibiotic activity increases by at least 70% of the amount expected.

The optimal pH for the action of the mannosidostreptomycinase is about 7 to 8; and reducing conditions, as well as the presence of Cu and Hg ions, which inhibit the action of the mannosidostreptomycinase, should be avoided.

The following examples are illustrative of the invention.

*Example 1.—(Illustrating conversion of mannosidostreptomycin to streptomycin during fermentation)*

A streptomycin-producing strain of (*Streptomyces griseus* is grown (by submerged culture) in a meat extract-peptone-glucose medium (Schatz, Bugie, and Waksman, S. A.; Proc. Soc. Exp. Biol. Med. 55, 66–69, 1944); and similarly in a soybean meal-glucose culture medium (Rake and Donovick, J. Bact. 52, 223, 1946). Analysis of samples removed from each of these cultures at intervals, as shown in the following table, indicates that the mannosidostreptomycin originally formed and/or concurrently formed with streptomycin is converted to streptomycin as the fermentation proceeds; and that by continuing the fermentation sufficiently, substantially all of the mannosidostreptomycin is converted to streptomycin (which may be recovered from the culture liquid and/or solids in the conventional manner).

| Incubation period, days | "Meat extract" medium | | | "Soybean meal" medium | | |
|---|---|---|---|---|---|---|
| | Bioassay of culture (u/ml.) | Analyses of product | | Bioassay of culture (u/ml.) | Analyses of product | |
| | | Mannosidostreptomycin, Per Cent | Streptomycin, Per Cent | | Mannosidostreptomycin, Per Cent | Streptomycin, Per Cent |
| 1 | 27 | 100 | 0 | | | |
| 2 | 116 | 47 | 53 | 279 | 69 | 31 |
| 3 | 129 | 47 | 53 | 331 | 41 | 59 |
| 4 | 112 | 50 | 50 | 367 | 45 | 55 |
| 5 | 120 | 19 | 81 | 447 | 8 | 92 |
| 6 | 125 | 8 | 92 | | | |
| 7 | 110 | 1 | 99 | 434 | 3 | 97 |

*Example 2.—(Illustrating conversion of added mannosidostreptomycin to streptomycin by growing cultures of Streptomyces griseus)*

To a five-day-old growing culture of a streptomycin-producing strain of *Streptomyces griseus* in a soybean meal medium (cf. Example 1), having a potency of 150 units/ml., is added sufficient streptomycin complex (hydrochloride) so that the final concentration of mannosidostreptomycin in the culture is 0.16 mg./ml., and the culture has a total activity of 287 units/ml. After 24 hours further incubation, no mannosidostreptomycin is detectable in the culture, and the antibiotic activity thereof has increased to 397 units/ml. The resulting culture is treated in the same manner as the streptomycin cultures obtained prior to this invention. to recover the streptomycin and (if desired) convert the streptomycin into dihydrostreptomycin.

*Example 3.—(Illustrating conversion of dihydromannosidostreptomycin to dihydrostreptomycin by growing cultures of Streptomyces griseus)*

To a five-day-old growing culture of a streptomycin-producing strain of *Streptomyces griseus* in a soybean meal medium (cf. Example 1), having a potency of 335 units/ml., is added sufficient dihydrostreptomycin complex (hydrochloride) so that the final concentration of dihydromannosidostreptomycin in the culture is 0.14 mg./ml., and the culture has a total activity of 484 units/ml. After 24 hours further incubation, only 0.02 mg./ml. of dihydromannosidostreptomycin remains in the culture, and the antibiotic activity thereof has increased to 533 units/ml. By treatment of the resulting culture in the same manner as the cultures obtained prior to this invention, a product consisting of streptomycin and dihydrostreptomycin is obtained; and the streptomycin content thereof is then converted into dihydrostreptomycin by catalytic hydrogenation, the (total) dihydrostreptomycin being then recovered in the conventional manner.

*Example 4.—(Illustrating conversion of mannosidostreptomycin to streptomycin by cell-free enzyme preparations)*

A cell-free culture filtrate is prepared from a nine-day-old culture of a streptomycin-producing strain of *Streptomyces griseus*, by removing the mycelium by centrifiguration and filtration. To 60 ml. of this solution (containing no mannosidostreptomycin and having a potency of 575 units/ml.) is added 108 mg. of mannosidostreptomycin (hydrochloride), the resulting solution having a potency of 1000 units/ml.; and the culture is incubated 16 hours more on a shaking machine at 26° C. The resulting culture contains only 0.3 mg. mannosidostreptomycin per ml., and its antibiotic activity has increased to 1675 units/ml. (representing about three-fourths of the expected increase in antibiotic activity on the conversion of mannosidostreptomycin to streptomycin, as indicated by analysis for mannosidostreptomycin); and it may be treated in the conventional manner to recover the streptomycin and, if desired, convert it to dihydrostreptomycin.

*Example 5.—(Illustrating conversion of mannosidostreptomycin to streptomycin by purified mannosidostreptomycinase)*

A cell-free culture filtrate is prepared from a five-day-old culture of a strain of *Streptomyces griseus* producing streptomycin, by removing the mycelium by centrifugation and filtration. 50 ml. of such filtrate (A) is added to 150 ml. of chilled 95% ethanol; and the resulting precipitate is collected by centrifugation, washed with 25 ml. ethanol, and resuspended in 10 ml. of 0.5 M sodium bicarbonate solution (pH 7.4). To this suspension (a concentrate of mannosidostreptomycinase having no measurable streptomycin potency) is added sufficient mannosidostreptomycin (hydrochloride) to bring the potency up to 235 units/ml; and this mixture is incubated for 6 hours at 26° C. The resulting product has a potency of 575 units/ml., representing about 80% of the expected increase in potency on complete conversion of the mannosidostreptomycin to streptomycin; and it may be treated in the conventional manner (i. e., like a streptomycin-containing culture filtrate) to recover the streptomycin and, if desired, convert it to dihydrostreptomycin. [By way of contrast, 1 ml. of the culture filtrate A is capable of converting 0.25 mg. mannosidostreptomycin to streptomycin, whereas 1 ml. of the mannosidostreptomycinase concentrate is capable of converting 0.7 mg. mannosidostreptomycin to streptomycin.]

The hydrochloride of the mannosidostreptomycin, dihydromannosidostreptomycin, and their respective complexes employed in the foregoing examples may be replaced by the free-base form or by other water-soluble acid-addition salts, inter alia, the sulfate.

The invention may be variously otherwise embodied within the scope of the appended claims.

We claim:

1. The method of converting a member of the group consisting of mannosidostreptomycin and dihydromannosidostreptomycin into streptomycin and dihydrostreptomycin, respectively, which comprises adding a member of said group to a growing culture of a streptomycin-producing strain of *Streptomyces griseus*.

2. The method of converting a member of the group consisting of mannosidostreptomycin and dihydromannosidostreptomycin into streptomycin and dihydrostreptomycin, respectively which comprises growing a streptomycin-producing strain of *Streptomyces griseus* in contact with a suitable nutrient medium, separating the solids from the culture liquid, and treating a member of said group with this liquid.

3. The method of converting a member of the group consisting of mannosidostreptomycin and dihydromannosidostreptomycin into streptomycin and dihydrostreptomycin, respectively which comprises growing a streptomycin-producing strain of *Streptomyces griseus* in contact with a suitable medium, separating the solids from the culture liquid, adding a water-soluble alcohol to this liquid, recovering the resulting precipitate, and treating a member of said group with this precipitate in an aqueous medium.

4. The method of converting the mannosidostreptomycin content of streptomycin complex into streptomycin, which comprises adding streptomycin complex to a growing culture of a streptomycin-producing strain of *Streptomyces griseus*, incubating the culture until substantially no mannosidostreptomycin is detectable in the culture, and recovering the streptomycin in the culture.

5. The method of converting the dihydromannosidostreptomycin content of dihydrostreptomycin complex into dihydrostreptomycin, which comprises adding dihydrostreptomycin complex to a growing culture of a streptomycin-producing strain of *Streptomyces griseus*, incubating the culture until substantially no dihydromannosidostreptomycin is detectable in the culture, recovering the streptomycin and dihydrostreptomycin in the culture, and converting the former component into dihydrostreptomycin.

6. The method of converting mannosidostreptomycin into streptomycin, which comprises growing a streptomycin-producing strain of *Streptomyces griseus* in contact with a suitable nutrient medium, separating the solids from the culture liquid, adding mannosidostreptomycin to this liquid, and incubating the liquid until substantially no mannosidostreptomycin is detectable therein.

ASGER F. LANGLYKKE.
DAVID PERLMAN.

REFERENCES CITED

The following references are of record in the file of this patent:

UNITED STATES PATENTS

| Number | Name | Date |
|---|---|---|
| 2,449,866 | Waksman | Sept. 21, 1948 |

OTHER REFERENCES

Waksman, Proc. Natl. Acad. Sci., 31, 5, May 1945, pages 129–137.